United States Patent
Fields et al.

(10) Patent No.: US 9,056,616 B1
(45) Date of Patent: Jun. 16, 2015

(54) STUDENT DRIVER FEEDBACK SYSTEM ALLOWING ENTRY OF TAGGED EVENTS BY INSTRUCTORS DURING DRIVING TESTS

(71) Applicant: STATE FARM MUTUAL AUTOMOBILE INSURANCE COMPANY, Bloomington, IL (US)

(72) Inventors: Brian Mark Fields, Normal, IL (US); Steve Roberson, Normal, IL (US); Abhishek Harish, Champaign, IL (US); Hyunji Lim, Champaign, IL (US); Matthew James Waughtel, Cuba, IL (US)

(73) Assignee: STATE FARM MUTUAL AUTOMOBILE INSURANCE, Bloomington, IL (US)

( * ) Notice: Subject to any disclaimer, the term of this patent is extended or adjusted under 35 U.S.C. 154(b) by 0 days.

(21) Appl. No.: 14/494,088

(22) Filed: Sep. 23, 2014

(51) Int. Cl.
 *B60W 40/08* (2012.01)
 *B60W 40/09* (2012.01)
 *G01C 21/36* (2006.01)

(52) U.S. Cl.
 CPC ........... *B60W 40/09* (2013.01); *G01C 21/3697* (2013.01)

(58) Field of Classification Search
 None
 See application file for complete search history.

(56) References Cited

U.S. PATENT DOCUMENTS

| 8,306,731 | B2 * | 11/2012 | Waggaman, III | 701/408 |
|---|---|---|---|---|
| 8,463,488 | B1 * | 6/2013 | Hart | 701/32.3 |
| 8,554,468 | B1 * | 10/2013 | Bullock | 701/408 |
| 8,731,768 | B2 * | 5/2014 | Fernandes et al. | 701/32.3 |
| 8,954,340 | B2 * | 2/2015 | Sanchez et al. | 705/4 |
| 2004/0054452 | A1 * | 3/2004 | Bjorkman | 701/29 |
| 2004/0158476 | A1 * | 8/2004 | Blessinger et al. | 705/1 |
| 2004/0236474 | A1 * | 11/2004 | Chowdhary et al. | 701/1 |
| 2004/0254698 | A1 * | 12/2004 | Hubbard et al. | 701/35 |
| 2005/0091018 | A1 * | 4/2005 | Craft | 703/8 |
| 2006/0109113 | A1 * | 5/2006 | Reyes et al. | 340/541 |
| 2007/0122771 | A1 * | 5/2007 | Maeda et al. | 434/62 |
| 2007/0257815 | A1 * | 11/2007 | Gunderson et al. | 340/903 |
| 2008/0064014 | A1 * | 3/2008 | Wojtczak et al. | 434/69 |
| 2008/0082372 | A1 * | 4/2008 | Burch | 705/4 |
| 2008/0255722 | A1 * | 10/2008 | McClellan et al. | 701/35 |
| 2009/0069954 | A1 * | 3/2009 | Aladesuyi | 701/2 |
| 2009/0079555 | A1 * | 3/2009 | Aguirre De Carcer et al. | 340/441 |
| 2010/0045452 | A1 * | 2/2010 | Periwal | 340/439 |

(Continued)

OTHER PUBLICATIONS

Office Action for U.S. Appl. No. 14/494,251, dated Dec. 5, 2014.

(Continued)

*Primary Examiner* — Jonathan M Dager
(74) *Attorney, Agent, or Firm* — Marshall, Gerstein & Borun LLP

(57) ABSTRACT

Tagged driving events may be generated during a driving session from sensor data collected via one or more sensors and/or entered by an instructor. The tagged driving events may include a description of each driving event and its associated severity or weight as it relates to a scoring process as well as a time and/or a location of the driving event. A driving session report may be generated using the tagged driving events and may include a driver feedback score that is weighted based on the severity associated with each of the tagged driving events and/or the collected data, a map of the driving session route that indicates a map location of each tagged driving event, and/or a listing of each tagged driving event. The driving session report may be displayed such that a user may select a tagged driving event to view information associated with the tagged driving event.

21 Claims, 5 Drawing Sheets

(56) References Cited

U.S. PATENT DOCUMENTS

| | | | |
|---|---|---|---|
| 2010/0097208 A1* | 4/2010 | Rosing et al. | 340/539.13 |
| 2010/0174576 A1* | 7/2010 | Naylor | 705/8 |
| 2010/0191411 A1* | 7/2010 | Cook et al. | 701/33 |
| 2010/0253508 A1* | 10/2010 | Koen et al. | 340/539.13 |
| 2011/0043377 A1* | 2/2011 | McGrath et al. | 340/905 |
| 2011/0213628 A1* | 9/2011 | Peak et al. | 705/4 |
| 2011/0251752 A1* | 10/2011 | DeLarocheliere et al. | 701/33 |
| 2011/0254655 A1* | 10/2011 | Maalouf et al. | 340/3.1 |
| 2012/0021386 A1* | 1/2012 | Anderson et al. | 434/66 |
| 2012/0135382 A1* | 5/2012 | Winston et al. | 434/65 |
| 2012/0215375 A1* | 8/2012 | Chang | 701/1 |
| 2012/0303392 A1* | 11/2012 | Depura et al. | 705/4 |
| 2013/0006675 A1* | 1/2013 | Bowne et al. | 705/4 |
| 2013/0096731 A1* | 4/2013 | Tamari et al. | 701/1 |
| 2013/0164715 A1* | 6/2013 | Hunt et al. | 434/65 |
| 2013/0184928 A1* | 7/2013 | Kerkhof et al. | 701/29.1 |
| 2013/0189649 A1* | 7/2013 | Mannino | 434/65 |
| 2013/0209968 A1* | 8/2013 | Miller et al. | 434/65 |
| 2014/0080100 A1* | 3/2014 | Phelan et al. | 434/66 |
| 2014/0162219 A1* | 6/2014 | Stankoulov | 434/65 |
| 2014/0163848 A1* | 6/2014 | Tamir et al. | 701/117 |
| 2014/0195272 A1* | 7/2014 | Sadiq et al. | 705/4 |
| 2014/0272810 A1* | 9/2014 | Fields et al. | 434/65 |

OTHER PUBLICATIONS

U.S. Appl. No. 14/494,251, filed Sep. 23, 2014.

* cited by examiner

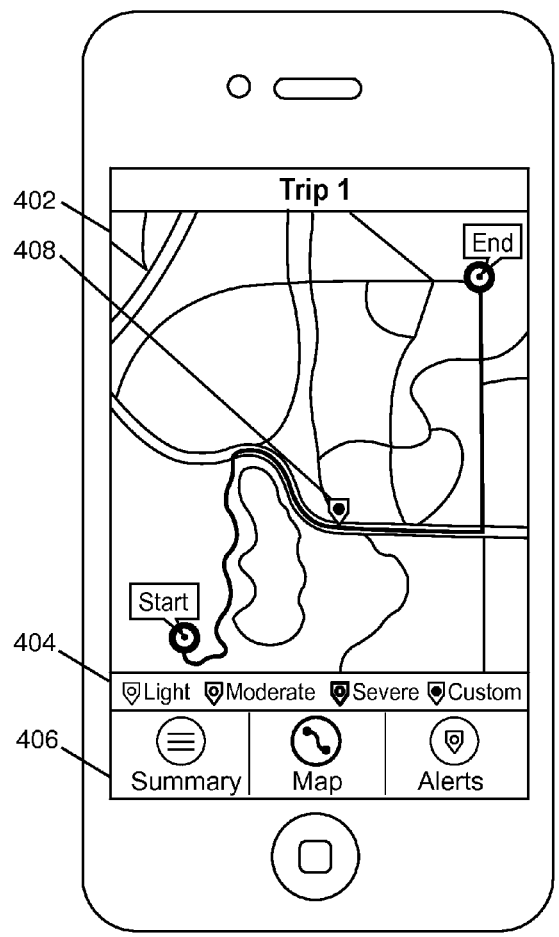 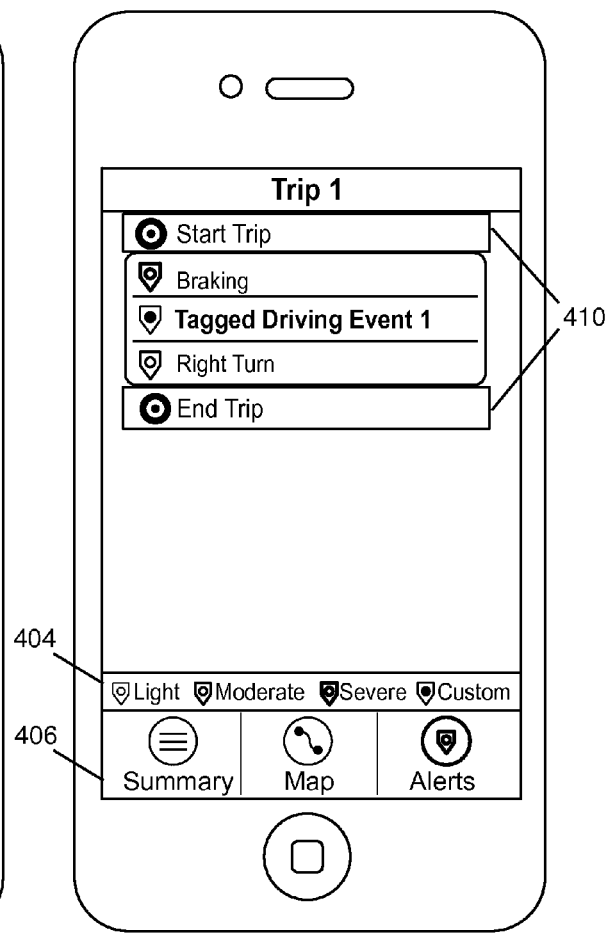
FIG. 4A  FIG. 4B

STUDENT DRIVER FEEDBACK SYSTEM ALLOWING ENTRY OF TAGGED EVENTS BY INSTRUCTORS DURING DRIVING TESTS

FIELD OF THE DISCLOSURE

The present disclosure relates to systems, methods, apparatus, and non-transitory computer readable media for facilitating driving tests, and, more particularly, to using one or more devices to allow an instructor to generate tagged driving events during a driving test session.

BACKGROUND

Traditionally, a student driver wanting to obtain a drivers' license may take driving classes and/or participate in various driving sessions whereby the student is evaluated on his driving performance. During a typical driving session, a student driver may be requested to drive along a certain route while the student's driving skills are observed and evaluated by an instructor. Based on the instructor's observations, the student driver is graded according to a set of criteria.

To improve the efficiency and objectivity of the driver testing process, typical systems may incorporate other sources of data collection in addition to the driver's observations. Using various data collection techniques, one or more computers and/or sensors in the vehicle may record data throughout a driving session. The instructor may then use a report generated from this data to provide feedback to the student and/or to evaluate the student's driving skills.

In spite of these additional sources of data collection, the instructor's role in determining the student's driving skills remains an important part of the performance evaluation process, since not all driver activity can be recorded with computer-based systems. Although an instructor may utilize automated processing techniques on the collected data to quickly generate the report, these automated processes do not typically allow a driving instructor to supplement or otherwise add her own comments to the report. As a result, a driving instructor's observations may not be reflected in any feedback provided to the student driver. Therefore, providing efficient and accurate feedback to student drivers that incorporates a driving instructor's observations presents several challenges.

BRIEF DESCRIPTION OF THE DRAWINGS

The figures described below depict various aspects of the system and methods disclosed herein. It should be understood that each figure depicts an aspect of a particular aspect of the disclosed system and methods, and that each of the figures is intended to accord with a possible aspect thereof. Further, wherever possible, the following description refers to the reference numerals included in the following figures, in which features depicted in multiple figures are designated with consistent reference numerals.

The following description discusses the indication and collection of data regarding one or more driving events. Driving events may be determined based on data collected through one or more sensors during s driving session, or may be determined when so indicated via user input. Although driving events determined via sensor data and user input may be different types of driving events, a driving event may be any event occurring during the driving session that may be relevant for purposes of performance evaluation or may be an observation that is made by the instructor to be conveyed to the student. Driving events may be negative or positive based on how each event reflects upon a driver's performance. Examples of negative driving events may include failure to stop at a stop sign, failure to yield, executing a turn too fast, etc. Examples of positive driving events may be performing a well-executed turn, recognizing and yielding according to the proper right-of way, etc.

FIG. 4A illustrates an example screenshot 400 of a device displaying a driving session report as a map including a tagged driving event in accordance with an exemplary aspect of the present disclosure.

FIG. 4B illustrates an example screenshot 450 of a device displaying the driving session report as a list including the tagged driving event in accordance with an exemplary aspect of the present disclosure.

DETAILED DESCRIPTION

I. Data Collection During Student Driver Testing

Figure 1:
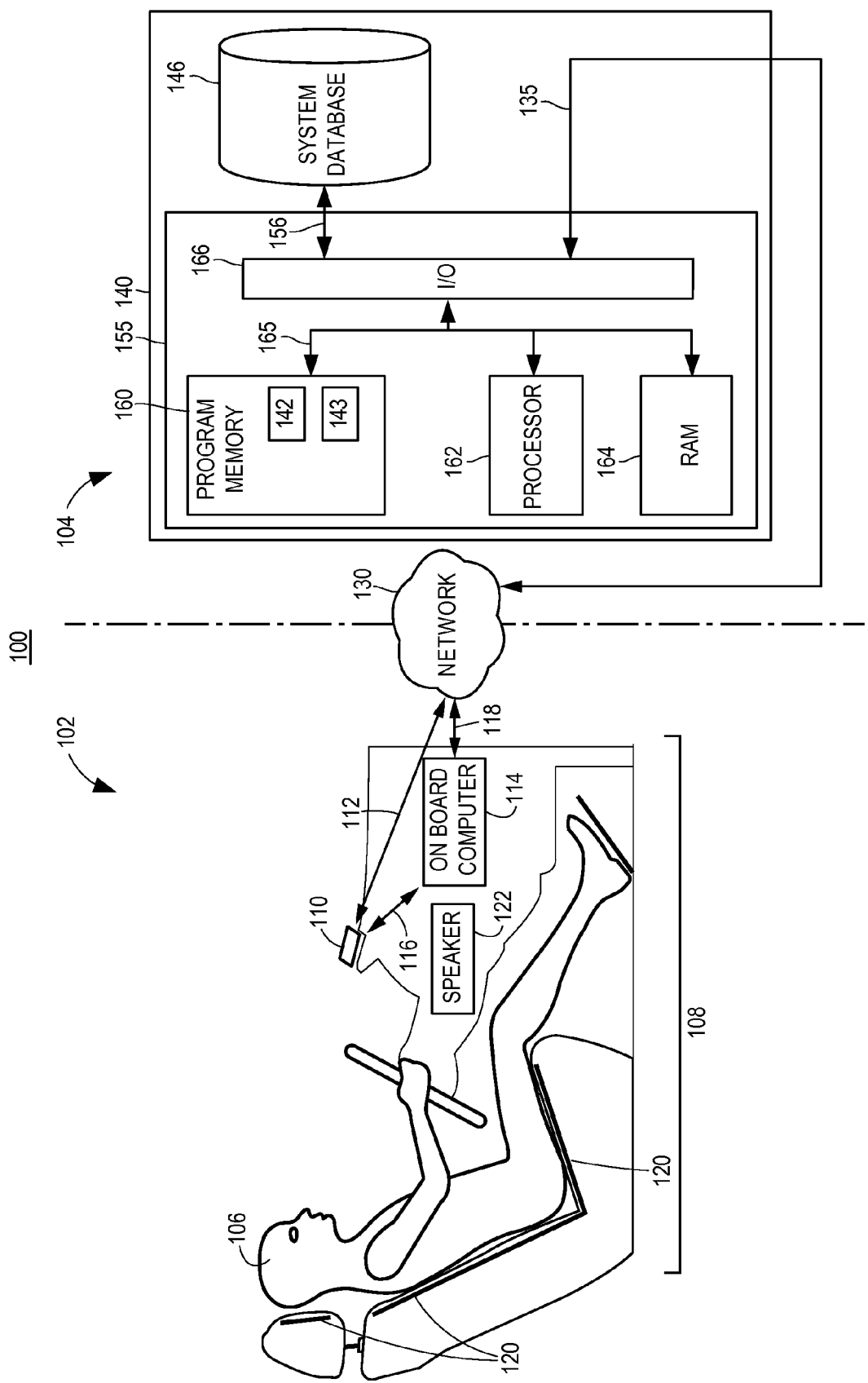
FIG. 1 illustrates a block diagram of an exemplary driver's education evaluation system 100 in accordance with an exemplary aspect of the present disclosure.

FIG. 1 illustrates a block diagram of an exemplary driver's education evaluation system 100 in accordance with an exemplary aspect of the present disclosure. Driver's education evaluation system 100 includes hardware and software applications, as well as various data communication channels for facilitating data communications between the various hardware and software components. Driver's education evaluation system 100 may be divided into front-end components 102 and back-end components 104.

In various aspects, any suitable number of front-end components 102 may be disposed within one or more devices 110. Device 110 may be permanently or removably installed in a vehicle 108 (e.g., a car, truck, etc.). Additionally or alternatively, the vehicle 108 may include an on-board computer 114. In various aspects, device 110 may be implemented as any suitable computing device, such as a smartphone, mobile device, tablet computer, laptop computer, dedicated driver's education evaluation computer, wearable computing device, etc.

On-board computer 114 may be permanently installed in a vehicle 108 and may interface with various sensors in vehicle 108 (e.g., a braking sensor, a speedometer, a tachometer, etc.) and/or may interface with various external output devices in vehicle 108 such as one or more tactile alert systems 120, one or more speakers 122, one or more displays, etc. A display is not shown in FIG. 1 for purposes of brevity. In various aspects, on-board computer 114 may be a general-use on-board computer configured to perform any suitable functions related to vehicle operation and/or may be implemented as a dedicated driver's education evaluation computer. In an aspect, on-board computer 114 may be installed by the manufacturer of vehicle 108 or as an aftermarket modification to vehicle 108, for example. In various aspects, device 110 and/or on-board computer 114 may be a thin-client device which outsources any suitable portion of processing to server 140 via network 130.

On-board computer 114 may supplement the functions performed by device 110 described herein by, for example, sending and/or receiving information to and from device 110.

Device 110 and on-board computer 114 may communicate with network 130 over links 112 and 118, respectively. Additionally, device 110 and on-board computer 114 may communicate with one another directly over link 116. Vehicle 108 may also include a tactile alert system 120 (e.g., a seat that can vibrate) that may present tactile alerts to the vehicle operator 106 on command from device 110 and/or on-board computer 114. While shown in a slightly reclined sitting position, those of ordinary skill in the art will appreciate that the student driver 106 could be situated in any number of ways (e.g., reclining at a different angle, etc.) and operating the vehicle using controls other than the steering wheel and pedals shown in FIG. 1 (e.g., one or more sticks, yokes, levers, etc.).

In various aspects, front-end components 102 may include any suitable combination of hardware and/or software components that are configured to communicate with back-end components 104 via network 130. Network 130 may be any suitable network that facilitates communications between front-end components 102 and back end components 104. Network 130 may include, for example, a proprietary network, a secure public internet, a mobile-based network, a virtual private network or some other type of network, such as dedicated access lines, plain ordinary telephone lines, satellite links, a public switched telephone network (PSTN), etc., or any suitable combination thereof. In aspects in which network 130 facilitates a connection to the Internet, data communications may take place over the network 130 via one or more suitable Internet communication protocols. Back-end components 104 include a server 140. Server 140 may include one or more computer processors configured to execute various software applications, components of the driver's education evaluation system 100, and/or other suitable software applications.

Server 140 may further include a database 146. Database 146 is configured to store data related to the operation of driver's education evaluation system 100. Such data might include, for example, data collected by device 110 and/or on-board computer 114, which may pertain to the driver's education evaluation system 100 and may be uploaded to the server 140 in the form of images, sensor input data, data analyzed according to the methods discussed below, tagged driving events and/or any suitable data associated with each respective tagged driving event, or any other suitable type of data. Server 140 may access data stored in database 146 when executing various functions and tasks associated with the operation of driver's education evaluation system 100.

Although driver's education evaluation system 100 is shown in FIG. 1 as including one server 140, one device 110, and one on-board computer 114, various aspects include driver's education evaluation system 100 implementing any suitable number of servers 140, devices 110, and/or on-board computers 114. For example, the driver's education evaluation system 100 may include a plurality of servers 140 and a large number (e.g., 100) of devices 110, any suitable number of which may be interconnected via the network 130. Device 110 may perform the various functions described herein in conjunction with on-board computer 114 or alone (in such cases, on-board computer 114 need not be present).

Furthermore, in aspects whereby more than one server 140 is implemented, processing performed by the one or more servers may be distributed among the plurality of servers in an arrangement known as "cloud computing." According to this example, this configuration may provide several advantages, such as, for example, enabling near real-time uploads and downloads of information as well as periodic uploads and downloads of information. This may provide for a thin-client aspect of device 110 and/or on-board computer 114 discussed herein as well as acting as a backup of some or all of the data gathered by device 110 and/or on-board computer 114.

Alternatively, driver's education evaluation system 100 may include only the front-end components 102. For example, device 110 and/or on-board computer 114 may perform any suitable portion of the processing associated with gathering data, receiving user input, generating tagged driving events and any suitable data associated with the tagged driving events, generating driving session and/or performance reports for the student driver 106, storing the driving session and/or performance reports, and/or sending the driving session and/or performance reports to back-end components 104 as discussed herein. As such, driver's education evaluation system 100 may be a "stand-alone" system, neither sending nor receiving information over network 130.

Server 140 may have a controller 155 that is configured to communicate with database 146 via a link 156. As will be appreciated by those of ordinary skill in the relevant art(s), while not shown, additional databases may be linked to the controller 155 in any suitable manner. Controller 155 may include a program memory 160, a processor 162, a random-access memory (RAM) 164, and an input/output (I/O) circuit 166, any combination of which may be interconnected via an address/data bus 165. In various aspects, program memory 160 may be implemented as a non-transitory tangible computer readable memory configured to store computer-readable instructions that when executed by the processor 162 cause the server 140 to perform various acts, such as implementing various applications stored in program memory 160, such as a server application 142 and a web server 143, for example.

The instructions for server application 142 may cause server 140 to implement the methods described herein. While shown as a single block in FIG. 1, various aspects include server application 142 having any suitable number of different programs, modules, routines, and/or sub-routines that may collectively cause server 140 to run server application 142. Although only one microprocessor 162 is shown in FIG. 1, various aspects of server 140 may include multiple microprocessors 162. Similarly, aspects of the memory of controller 155 may include multiple RAMs 164 and multiple program memories 160.

Further, while the instructions for server application 142 and web server 143 are shown as being stored in program memory 160, various aspects may include the instructions being additionally or alternatively stored in database 146 and/or RAM 164. Although I/O circuit 166 is shown as a single block, various aspects may include I/O circuit 166 having any suitable number and/or types of I/O circuits. RAM(s) 164 and program memories 160 may be implemented as semiconductor memories, magnetically readable memories, and/or optically readable memories, for example. The controller 155 may also be configured to communicate over network 130 via a link 135 and the I/O circuit 166.

In an aspect, device 110 may be configured with suitable hardware and/or software (e.g., one or more applications, programs, files, etc.) to receive data collected from on-board computer 114 during a driving session and use this data to generate one or more driving session reports. For example, device 110 may collect data related to one or more driving events such as braking, steering, acceleration, stopping, etc. Once the driving session has ended, device 110 may use this data to generate the driving session report to provide feedback to the student driver. In accordance with an aspect, device 110 is configured to generate one or more driving session reports using any of the techniques as described in commonly-assigned U.S. application Ser. No. 13/844,090, which is hereby incorporated by reference in its entirety.

In various aspects, device 110 may determine that a driving event has occurred when a user manually indicates this via user input at device 110. Device 110 may collect additional information from the user specifying the type of driving event and/or any other details associated with the driving event, and then generate tagged driving based on the data entered by the user.

Additionally or alternatively, various aspects include device 110 being configured to collect data autonomously and/or data manually input by a user, such as a driving instructor, for example. In accordance with such aspects, device 110 may be configured to utilize this data alternatively or in addition to data that may be collected by on-board computer 114. For example, device 110 may collect GPS and/or map data and overlay this data with data collected from on-board computer 114 and/or data input by a user to generate one or more driving session reports.

The driving session reports may include, for example, a map of the driving session route indicating a mapped location of tagged driving events collected from on-board computer 114. In other words, device 110 may allow an instructor to manually generate tagged driving events during a driving session based on any number of observations to supplement the data collected from on-board computer 114. In this way, the driving session report may provide enhanced feedback to the user.

II. Collection of Data and Generation of Driving Session Reports

Figure 2:
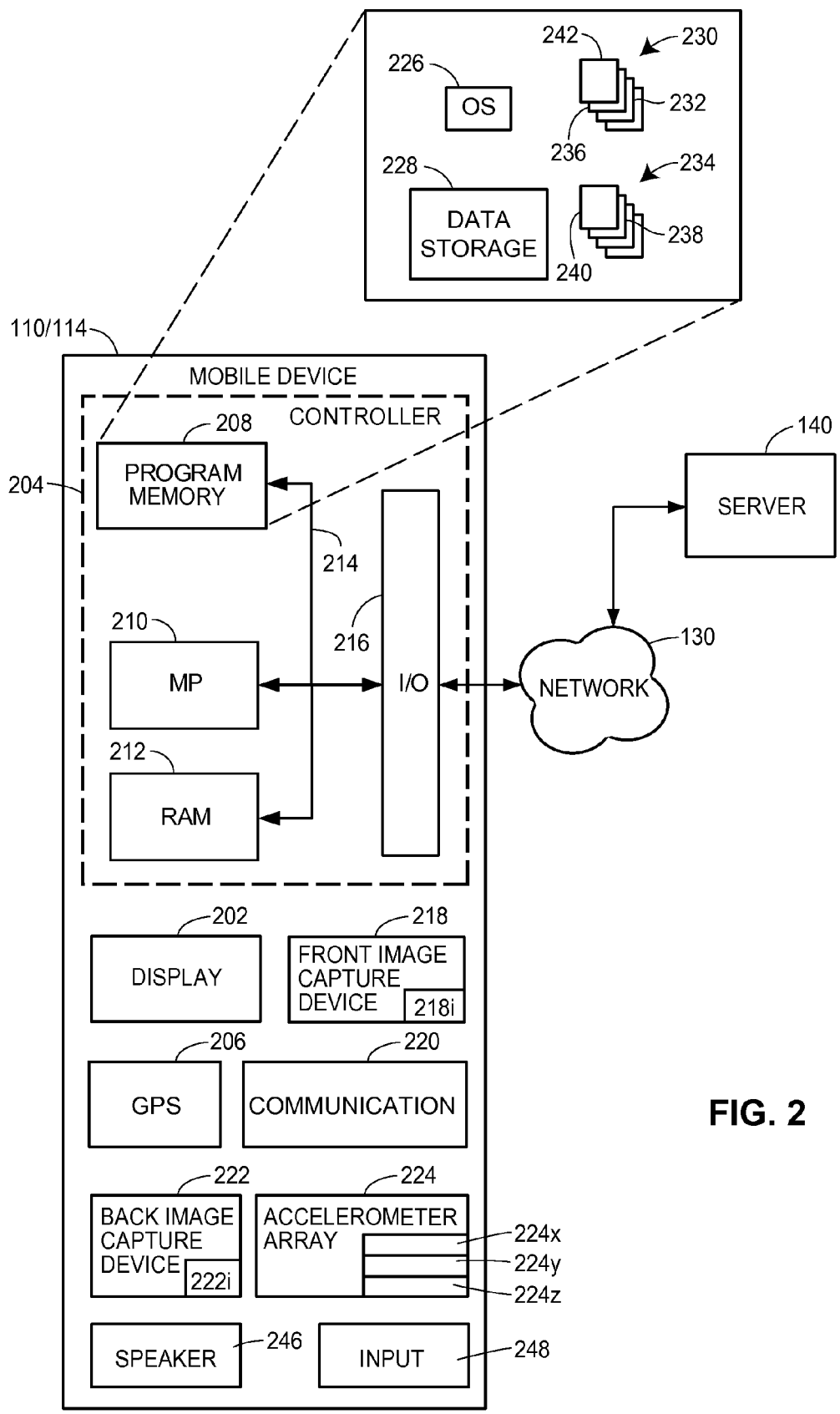
FIG. 2 illustrates a block diagram of an exemplary device 110 and/or on-board computer 114 in accordance with an exemplary aspect of the present disclosure.

FIG. 2 illustrates a block diagram of an exemplary device 110 and/or on-board computer 114 in accordance with an exemplary aspect of the present disclosure. Device 110 and/or on-board computer 114 may include a display 202, a Global Positioning System (GPS) unit 206, a communication unit 220, a front image capture device 218, a back image capture device 222, an accelerometer array 224, a user-input device 248, a speaker 246, and a controller 204.

In various aspects, device 110 and/or on-board computer 114 may be integrated into a single device. Device 110 and/or on-board computer 114 may share one or more functions such that either of device 110 or on-board computer 114 may perform any portion (or all) of the functions performed by the other device. As will be appreciated by those of ordinary skill in the relevant art(s), functions performed by either device 110 and/or on-board computer 114 may also be performed by on-board computer 114 in concert with device 110.

Controller 204 includes a program memory 208, one or more of a microcontroller or a microprocessor (MP) 210, a random-access memory (RAM) 212, and an input/output (I/O) circuit 216, each of which is interconnected via an address/data bus 214. In various aspects, program memory 208 may be implemented as a non-transitory tangible computer readable media configured to store computer-readable instructions that when executed by controller 204 cause controller 204 to perform various acts. In various aspects, program memory 208 may include various portions that may include instructions associated with corresponding functions to be performed by controller 204. For example, as shown in FIG. 2, program memory 208 may include an operating system 226, a plurality of software applications 230, and/or a plurality of software routines 234. To provide another example, program memory 208 may include other portions to store data that may be read from and written to by processor 210, such as data storage 228, for example.

In an aspect, operating system 226 may be implemented as any suitable operating system platform depending on the particular implementation of device 110 and/or on-board computer 114. For example, operating system 226 may be implemented as one of a plurality of mobile platforms such as the iOS®, Android™, Palm® webOS, Windows® Mobile/Phone, BlackBerry® OS, or Symbian® OS mobile technology platforms, developed by Apple Inc., Google Inc., Palm Inc. (now Hewlett-Packard Company), Microsoft Corporation, Research in Motion (RIM), and Nokia, respectively.

In an aspect, data storage 228 may include data such as user profiles and preferences, application data for the plurality of applications 230, routine data for the plurality of routines 234, and any other suitable data necessary to interact with the server 140 via network 130. In some aspects, controller 204 may also be configured to communicate with additional data storage mechanisms (e.g., one or more hard disk drives, optical storage drives, solid state storage devices, etc.) that reside within device 110 and/or on-board computer 114.

In an aspect, GPS unit 206 may use "Assisted GPS" (A-GPS), satellite GPS, or any other suitable global positioning protocol (e.g., the GLONASS system operated by the Russian government) or system that locates the position the device 110 and/or on-board computer 114. For example, A-GPS may utilize cell phone towers or Wi-Fi hotspots (e.g., wireless router points) via communications sent and/or received via communication unit 220 to more accurately and more quickly determine location of the device 110 and/or on-board computer 114. On the other hand, satellite GPS is typically more useful in more remote regions that lack cell towers or Wi-Fi hotspots.

In an aspect, front and back image capture devices 218 and 222 may be integrated as part of device 110 and/or on-board computer 114 and may be implemented as peripheral cameras, such as webcams, cameras installed inside the vehicle 108, cameras installed outside the vehicle 108, etc., that are configured to communicate with suitable portions of device 110 and/or on-board computer 114. In an aspect, front image capture device 218 may be oriented toward student driver 106 to observe student driver 106 as part of one or more autonomous data collection processes. In an aspect, back image capture device 222 may be oriented toward the front of vehicle 108 to observe the road, lane markings, and/or other objects in front of vehicle 108 as part of one or more autonomous data collection processes.

In some aspects, device 110 and/or on-board computer 114 may include both a front image capture device 218 and a back image capture device 222. In other aspects, device 110 and/or on-board computer 114 may include only front image capture device 218 or back image capture device 222. Front image capture device 218 and/or back image capture device 222 may include an infrared illuminator 218$i$, 222$i$, respectively, to facilitate low light and/or night image capturing. Infrared illuminator 218$i$, 222$i$ may be activated when light is insufficient for image capturing.

In an aspect, accelerometer array 224 may be implemented as one or more accelerometers positioned to determine the force and direction of movements of device 110 and/or on-board computer 114. In some aspects, accelerometer array 224 may include an X-axis accelerometer 224$x$, a Y-axis accelerometer 224$y$, and a Z-axis accelerometer 224$z$ configured to measure the force and direction of movement in each dimension, respectively. As will be appreciated by those of ordinary skill in the relevant art(s), a three dimensional vector describing movement of device 110 and/or on-board computer 114 through three dimensional space can be established by combining the outputs of the X-axis, Y-axis, and Z-axis accelerometers 224$x$, $y$, and $z$ using any suitable methods.

GPS unit 206, front image capture device 218, back image capture device 222, and accelerometer array 224 may be referred to collectively as the "sensors" of device 110 and/or on-board computer 114. As will be appreciated by those of ordinary skill in the relevant art(s), various aspects of device 110 and/or on-board computer 114 include any suitable number of additional GPS units 206, front image capture devices 218, back image capture devices 222, and/or accelerometer arrays 224.

Communication unit 220 may communicate with the server 140 via any suitable communication protocol via network 130. In various aspects, communication unit 220 may communicate with server 140 using a communications protocol based on the type of network 130, such as a wireless telephony network (e.g., GSM, CDMA, LTE, etc.), a Wi-Fi network (802.11 standards), a WiMAX network, a Bluetooth network, etc. Communication unit 220 may also be capable of communicating using a near field communication standard (e.g., ISO/IEC 18092, standards provided by the NFC Forum, etc.). Further, communication unit 220 may use a wired connection to facilitate communications with server 140 via network 130.

In various aspects, user-input device 248 may be implemented as any suitable device configured to collect user input, such as a "soft" keyboard that is displayed on the display 202 of device 110 and/or on-board computer 114, an external hardware keyboard communicating via a wired or a wireless connection (e.g., a Bluetooth keyboard), an external mouse, etc. User-input device 248 may also include a microphone configured to receive user voice input. As previously discussed with reference to controllers 155 and 224, as will be appreciated by those of ordinary skill in the relevant art(s), although FIG. 2 depicts only one processor 210, controller 204 may include any suitable number of MPs 210.

Memory of controller 204 may include any suitable number of RAMs 212 and any suitable number of program memories 208. Although FIG. 2 depicts I/O circuit 216 as a single block, various aspects of I/O circuit 216 may include any suitable number of different types of I/O circuits. In various aspects, controller 204 may implement RAM(s) 212 and program memories 208 as any suitable type of memory, such as non-transitory computer readable memories, semiconductor memories, magnetically readable memories, and/or optically readable memories, for example.

In various aspects, one or more processors 210 may be configured to execute any of one or more of the plurality of software applications 230 and/or any one or more of the plurality of software routines 234 residing in program memory 208 in addition to other software applications.

In an aspect, one of the plurality of applications 230 may be a client application 232 that may be implemented as a series of machine-readable instructions for performing the various tasks associated with implementing the driver's education evaluation system 100 as well as receiving information, displaying information, and/or transmitting information between device 110 and/or on-board computer 114 and/or server 140.

In various aspects, any of the plurality of applications 230 may be implemented as a stand-alone system or as a system wherein the front-end components 102 communicate with back-end components 104 as described herein. Additionally, any of the plurality of applications 230 may include machine-readable instruction for implementing a user interface to allow a user to input commands to and receive information from driver's education evaluation system 100 in accordance with the functionality supported by each respective application.

One of the plurality of applications 230 may be a native web browser 236, such as Apple's Safari®, Google Android™ mobile web browser, Microsoft Internet Explorer® for Mobile, Opera Mobile™, that may be implemented as a series of machine-readable instructions for receiving, interpreting, and displaying web page information from the server 140 or other back-end components 104 while also receiving inputs from the user. Another one of the plurality of applications 230 may include an embedded web browser 242 that may be implemented as a series of machine-readable instructions for receiving, interpreting, and displaying web page information from the servers 140 or other back-end components 104 within client application 232.

Additionally, server 140 may include any suitable number of software applications. In various aspects, server 140 may include software applications configured to facilitate the generation of data content to be included in the web pages sent from the web server 143 to the device 110 and/or on-board computer 114. The software applications may be executed on the same computer processor as web server application 143, or on different computer processors.

In aspects in which device 110 and/or on-board computer 114 is a thin-client device, server 140 may perform any suitable portion of the processing functions remotely that would otherwise be performed by device 110 and/or on-board computer 114. In such aspects, device 110 and/or on-board computer 114 may gather data from its respective sensors as described herein, but device 110 and/or on-board computer 114 may send the data to server 140 for remote processing instead of analyzing the data locally. In such aspects, server 140 may perform the analysis of the gathered data (which may include any combination of tagged driving events collected via sensors and/or input by a user) to generate the driving session report discussed herein.

As previously discussed, various aspects of driver's education evaluation system 100 may be performed by any combination of device 110, on-board computer 114, and/or server 140. In aspects in which device 110 and/or on-board computer 114 offload processing tasks to server 114, native web browser 236 and/or embedded web browser 242 may facilitate the transfer of data using one or more web-based applications.

One of the plurality of routines 234 may include an image capture routine 238 that coordinates with the image capture devices 218, 222 to retrieve image data for use with one or more of the plurality of applications, such as the client application 232, or for use with any other suitable routines. Another routine in the plurality of routines may include an accelerometer routine 240 that determines the force and direction of movements of the device 110 and/or on-board computer 114. The accelerometer routine 240 may process data from the accelerometer array 224 to determine a vector describing the motion of the device 110 and/or on-board computer 114 for use with the client application 232. In some aspects where the accelerometer array 224 has X-axis, Y-axis, and Z-axis accelerometers 224x, y, z, the accelerometer routine 240 may combine the data from each accelerometer 224x, y, and z to establish a vector describing the motion of the device 110 and/or on-board computer 114 through three dimensional space. Furthermore, in some aspects, the accelerometer routine 240 may use data pertaining to less than three axes, such as when determining when the vehicle 108 is braking.

One of the plurality of applications 230 may include a driving-event tagging application 237. In an aspect, driving-event tagging application 237 may be a driving-event tagging application that is installed on mobile device 110 and/or on-board computer 114. For example, driving-event tagging application 237 may be downloaded and installed to mobile device 110 by a user. In an aspect, driving-event tagging application 237 may include instructions for implementing a user interface to allow a user to input commands, respond to prompts, and/or enter descriptions associated with any suitable number of tagged driving events. For example, driving-event tagging application 237 may allow a user to enter details regarding a type of driving event that has occurred and a description associated with the driving event, etc.

In an aspect, driving-event tagging application 237 may cooperate with one or more other sensors of device 110 and/or on-board computer 114, and/or communicate with server 140 to facilitate the entry of data associated with one or more manually entered driving events. For example, once a user indicates that a driving event has occurred, driving-event tagging application 237 may receive data from GPS unit 206 to determine a geographic location of the occurrence of the driving event. In addition, driving-event tagging application 237 may communicate with any other suitable portion of device 110, on-board computer 114, and/or server 140 to determine a time associated with the driving event occurrence. In this way, once a user indicates that a driving event has occurred, the corresponding driving event generated by driving-event tagging application 237 may include the time and location of the driving event as well as any description entered by the user.

In various aspects, driving-event tagging application 237 may cooperate with user input device 248 and/or display 202 to collect information associated with a driving event. For example, once a driving instructor indicates that a driving event has occurred, driving-event tagging application 237 may receive text input entered by the instructor via a soft keyboard displayed on display 202. To provide another example, driving-event tagging application 237 may include instructions that allow the instructor to record audio associated with the driving event. To provide yet another example, driving-event tagging application 237 may include instructions that allow the driving instructor to optionally select a type driving event description from a list of displayed options, thereby saving time and potentially allowing a greater number of tagged driving events to be generated during a driving session.

In an aspect, one of the plurality of routines 234 may include a tagged driving event routine 239. Tagged driving routine 239 may process data collected via any suitable number of the plurality of applications 230 and/or the plurality of routines 234 to generate a driving session report. In various aspects, tagged driving routine 239 may incorporate data collected from on-board computer 114 and/or device 110. The driving session report may be displayed via display 202, sent to server 140 via network 130, and/or sent to another suitable device via communication unit 220.

In various aspects, the driving session report may include varying details of the driving session to provide the driver with feedback regarding her driving performance skills. For example, if the driving instructor did not enter any driving occurrences during the driving session, then no tagged driving events would be generated regarding the instructor's input. But additional tagged driving events may still be generated using the data received via one or more sensors implemented by device 110 and/or on-board computer 114. In such an example, the driving session report could be generated using data recorded via these sensors, which may be similar to or the same as the reports described in the commonly assigned U.S. application Ser. No. 13/844,090.

However, if a user indicated that one or more driving events occurred during the driving session, then one or more tagged driving events may be generated based on the input and/or description associated with the driving events. In such a case, the driving session report may incorporate the tagged driving events as indicated by the instructor as part of the feedback provided to the student. In various aspects, the driving session report may be presented in any suitable format having any suitable data relevant to the student's driving performance during the driving session. For example, the driving session report could include one or more driver feedback scores, grades, ratings, etc. that are generated based on an analysis of any suitable number of tagged driving events, which may be generated from instructor input and/or from sensor data.

Additionally or alternatively, the driving session report may include a map of the driving session route with an overlay of any suitable number of tagged driving events, which may be generated from instructor input and/or from sensor data. To provide another example, the driving session report may include a listing any suitable number of tagged driving events, which again may be generated from instructor input and/or from sensor data.

As will be appreciated by those of ordinary skill in the relevant art(s), any suitable routine may be implemented by tagged driving routine 239 to generate the appropriate student driver feedback. For example, a weighting routine may be implemented that weights certain tagged driving events higher than others. In some aspects, a determination of how to weight tagged driving events generated from instructor entry could be based on a predetermined weighting corresponding to the driving event description that was selected by the user from a list of displayed options. For example, each displayed driving event option could have a corresponding weighting associated therewith for this purpose. In other aspects, the weighting value may be manually entered by the user upon creation of the tagged driving event. In either case, the weighting values for each of the tagged driving events may be used to generate an appropriate scaled driver feedback score, rating, etc., for use in the generation of the driving session report.

For example, if the driving session is a driving test for a state-issued driver's license, or is a practice run for such a test, an instructor and/or the local traffic laws may specify certain driving event criteria associated with automatic failure of a driving test. Examples of these types of driving events could include driving in excess of the school speed limit when such a speed limit is in effect, running a red light, driving the wrong way down a one-way street, failing to stop for a stop sign, making an illegal turn, passing a stopped school bus, etc. If such a driving event occurs, an instructor may indicate the severity of the driving event accordingly by entering text so indicating, selecting a displayed severity indicator, or selecting the appropriate displayed option that has a corresponding severity weight, etc. Aspects of driving-event tagging application 237 and/or tagged driving routine 239 include incorporating these severity indicators to weight these driving events to provide feedback indicative of a failed driving test (or, in the case of a practice test, that the result would be a failure) in the driving session report.

Both positive and negative types of tagged driving may be generated upon occurrence of a driving event. For example, an instructor could enter information that a turn was particularly well executed, that a student performed a slow and steady stop without excessive jerking, etc. Although most driving tests do not utilize positive types of driving event feedback for scoring purposes, this type of information is still valuable to student drivers who are still learning their strengths and weaknesses throughout the evaluation process.

Any suitable portion of the driving session report may be sent to another device and/or stored on another device in any suitable format that may be accessed and viewed by a user. For example, the driving session report may be saved to device 110, emailed to another device, stored on server 140 or another online storage medium, etc.

III. Example Screenshot of Device Application

Figure 3:
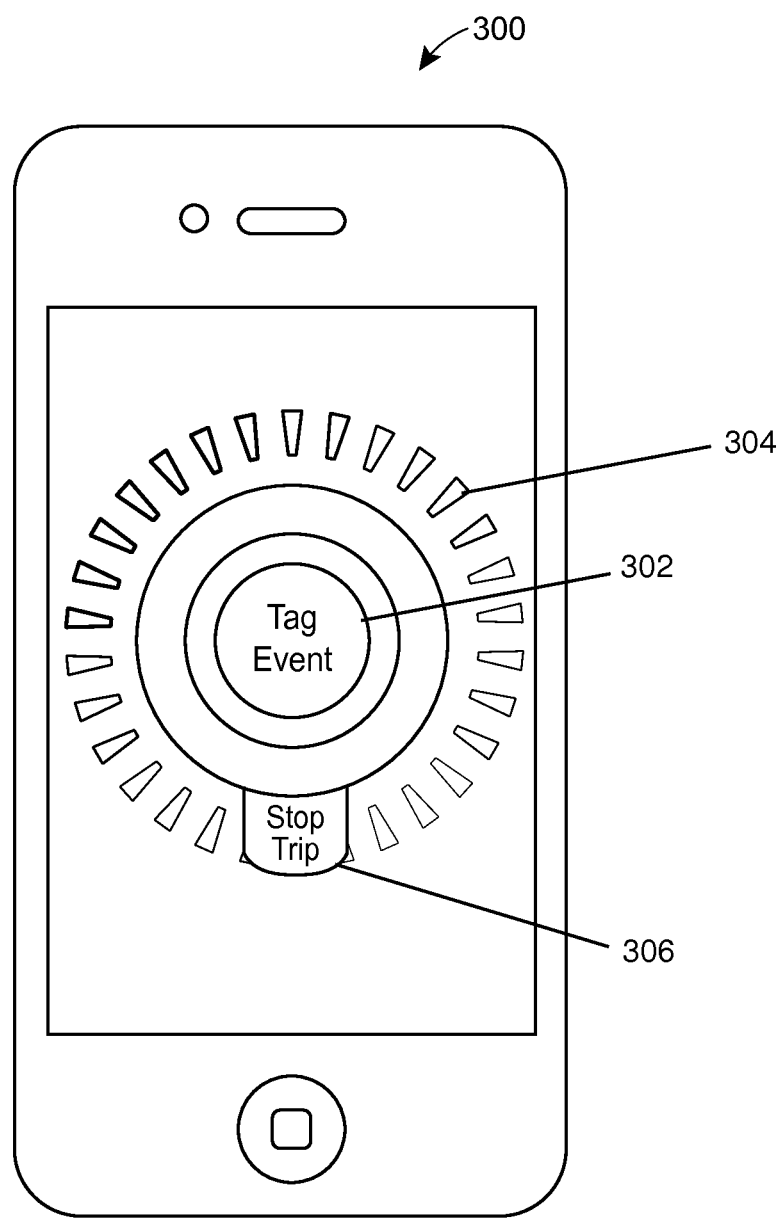
FIG. 3 illustrates an example screenshot 300 of a device used to generate tagged driving events in accordance with an exemplary aspect of the present disclosure.

FIG. 3 illustrates an example screenshot 300 of a device used to create tagged driving events in accordance with an exemplary aspect of the present disclosure. Screenshot 300 includes portions 302, 304, and 306. In the present aspects, the following screenshot shown in FIG. 3 is an example of what may be displayed to a user as part of a driving-event tagging application. In the present aspects, screenshot 300 may be displayed using any suitable interface device, such as display 202, for example, as shown in FIG. 2. As will be appreciated by those of ordinary skill in the relevant art(s), the example screenshot shown in FIG. 3 is for illustrative purposes, and the described functions may be implemented using any suitable format and/or design without departing from the spirit and scope of the present disclosure.

Portion 302 may include any suitable graphic, information, label, prompt, etc., to indicate that a user may select portion 302 upon occurrence of a driving event. As shown in FIG. 3, portion 302 includes a virtual button labeled "tag event" that may be selected by a user (e.g., by tapping the button with the user's finger). If a driving event occurs for which a user wishes to generate an associated tagged driving event, the user may select portion 302 to indicate this.

In accordance with various aspects, once portion 302 is selected by a user, a time and location of the selection may be stored. For example, once a user selects portion 302, driving-event tagging application 237 and/or tagged driving routine 239 may utilize information received from GPS unit 206 and/or any other suitable sensors or portions of device 110 to store a time and location of the occurrence of the event in a memory, such as data storage 228, for example.

In various aspects, one or more prompts may be displayed to the user (or the user may select from several options) to facilitate the collection of data after the selection of portion 302. In some aspects, these prompts may include a prompt allowing the user to record audio. In other aspects, the prompts may allow the user to enter text, select text that is displayed as part of a list of descriptions, and/or enter a severity level (weighting) associated with the driving event. In various aspects, the severity level may be selected from a numeric and/or color-coded scale, which may be entered by the user, selected by the user from a list of displayed options, assigned to a selected displayed description of the driving events, etc. These prompts are not shown in FIG. 3 for purposes of brevity.

For example, once the user selects portion 302, the user may type text describing the driving event. Then, the user may indicate a severity level once so prompted associated with the driving event, such as a 10 out of 10 with 10 being an automatic failure event, for example. Then, if a severity level is input by the user, a tagged driving event is generated and stored in a memory (e.g., data storage 228) including the time, location, description, and severity level associated with the driving event.

Portion 304 may include any suitable graphic, information, label, prompt, etc., to indicate that the application is currently running. In some aspects, portion 304 may be omitted.

In some aspects, device 110 and/or on-board computer 114 may detect the termination of a driving session based on an elapsed time and/or a position of the vehicle within a driving session route. In other aspects, the user may terminate the driving session at any time. Portion 306 may include any suitable graphic, information, label, prompt, etc., to indicate that a user may select portion 306 upon termination of the driving session. For example, a user may select portion 306 upon completion of the driving session route, or a user may select portion 306 when the driving session has ended prematurely, such as upon the occurrence of a driving event resulting in automatic failure of a test. Once the driving session has ended, either through the selection of portion 306 or via an automatic detection thereof, the driving session report may be generated.

IV. Example Screenshots of a Driving Session Report

FIG. 4A illustrates an example screenshot 400 of a device displaying a driving session report as a map including a tagged driving event in accordance with an exemplary aspect of the present disclosure.

Screenshot 400 includes map 402, portions 404 and 406, and tagged driving event 408 as part of a first driving session report format. In the present aspects, screenshot 400 is an example of what may be displayed to a user upon completion of, or termination of, a driving session. In the present aspects, the following example screenshot 400 may be displayed using any suitable interface device, such as display 202, for example, as shown in FIG. 2. As will be appreciated by those of ordinary skill in the relevant art(s), example screenshot 400 is for illustrative purposes, and the described functions may be implemented using any suitable format and/or design without departing from the spirit and scope of the present disclosure.

As shown in FIG. 4A, map 402 includes a map of the driving session route with a start point, an end point, and a mapped location of tagged driving event 408. Although map 402 only includes a single tagged driving event 408, aspects include map 402 displaying any suitable number of tagged driving events (including all tagged driving events) generated during the driving session and their corresponding map locations. For example, a setting may be provided and selected by a user that filters the number of tagged driving events displayed on map 402 to display only severe events, only tagged driving events generated from user entry, only tagged driving events generated sensor data, etc. Tagged driving event 408 may have been generated from user entry, e.g., via a user selecting portion 302, for example, as shown in FIG. 3, or from data collected via any suitable sensor in an autonomous fashion.

Portion 404 includes a color-coded and/or iconic scale indicating the severity associated with each of the tagged driving events, such as tagged driving event 408, for example. In the present aspect, any suitable number of "custom" severity levels may be implemented based on the particular type of driving session. For example, if the driving session report shown in screenshot 400 was implemented as part of an actual state driver's license test, then the "custom" text could be replaced with "FAIL," etc. To provide another example, if the driving session report shown in screenshot 400 was implemented as part of a driving class, then the "custom" text could be replaced with "good job," "nice work," "exemplary," etc.

As will be appreciated by those of ordinary skill in the relevant art(s), portion 404 may implement any suitable text and/or scale indicative of the severity of each tagged driving event. For example, a color code may be implemented reflecting a change in color gradients commensurate with the severity of each type of tagged driving event, which may be the same as the severity options presented to an instructor upon creation of the tagged driving event from instructor input. For example, in accordance with such aspects, a driving instructor could indicate a driving event occurrence as previously discussed with respect to FIG. 2, and then indicate whether the driving event was of a "light," "moderate," or "severe," importance. When the driving session report is subsequently generated as shown in screenshot 400, these same indicators could be used as a key to quickly identify each tagged driving event.

To provide another example, the color codes shown in portion 404 could be mapped to a numeric scale presented to an instructor upon creation of the tagged driving event from instructor input. For example, a numeric severity indicator of 1-3 on a scale of 0-10 could be equivalent to "light," etc. Although only four options are shown in screenshot 400, it will be appreciated by those of ordinary skill in the relevant art(s) that any suitable number of severity indicators may be used based on a particular application, screen size, etc.

Portion 406 includes user-selectable navigation buttons that allow a user to change the format of the driving session report. As shown in screenshot 400, the map format is selected, which corresponds to the mapped format of the driving session report displayed as screenshot 400. A user may also select a summary view, which is not shown in FIGS. 4A-B for purposes of brevity but may include, for example, any information relevant to the driving session such as duration, average speed, trip length, a numeric score, rating, grade, etc. Additionally or alternatively, aspects include a driver feedback score, such as the driver feedback score discussed in commonly-assigned U.S. application Ser. No. 13/844,090, for example, being displayed as part of the summary view. As further discussed below with respect to FIG. 4B, selection of the "alerts" view may display a list of tagged driving events as opposed to a map.

FIG. 4B illustrates an example screenshot 450 of a device displaying the driving session report as a list including the tagged driving event in accordance with an exemplary aspect of the present disclosure. Screenshot 450 includes portions 404, 406, and tagged driving event list 410 as part of a second driving session report format. In the present aspects, screenshot 450 is an example of what may be displayed to a user upon completion of, or termination of, a driving session. In the present aspects, the following example screenshot 450 may be displayed using any suitable interface device, such as display 202, for example, as shown in FIG. 2. As will be appreciated by those of ordinary skill in the relevant art(s), example screenshot 450 is for illustrative purposes, and the described functions may be implemented using any suitable format and/or design without departing from the spirit and scope of the present disclosure.

As shown in FIG. 4B, screenshot 450 still includes portions 404 and 406. However, map 402 is replaced with driving event list 410. In the example shown in screenshot 450, the "braking" and "right turn" tagged driving events may be generated by one or more sensors, such as those incorporated as part of device 110 and/or on-board computer 114, for example. Further in accordance with the example shown in screenshot 450, the tagged driving event "tagged driving event 1," may correspond to a tagged driving event created from instructor input.

Similar to map 402, various aspects include any suitable number of tagged driving events also being displayed on tagged driving event list 410. Similar to map 402, a setting may be provided and selected by a user that filters the number of tagged driving events displayed on tagged driving event list 410 to display only severe events, only tagged driving events generated from user entry, only tagged driving events generated from sensor data, etc.

Aspects also include the tagged driving events being displayed in map 402 and/or tagged driving event list 410 as selectable links. That is, once displayed, a user may select one or more tagged driving events displayed in map 402 and/or displayed in tagged driving event list 410 to view additional information associated with the selected tagged driving event. For example, a user could select the displayed tagged driving event in map 402 to access information related to a time and location of the tagged driving event, text and/or audio input by the instructor describing the event, etc. To provide another example, a user could select the displayed tagged driving event 1 in tagged driving event list 410 to access this information. To provide yet another example, a user could select the "braking" or "right turn" tagged driving events in tagged driving event list 410 to access detailed information such as lane location during the turn, time of braking, speed during the turn, etc.

V. An Example Tagged Driving Event Method

Figure 5:
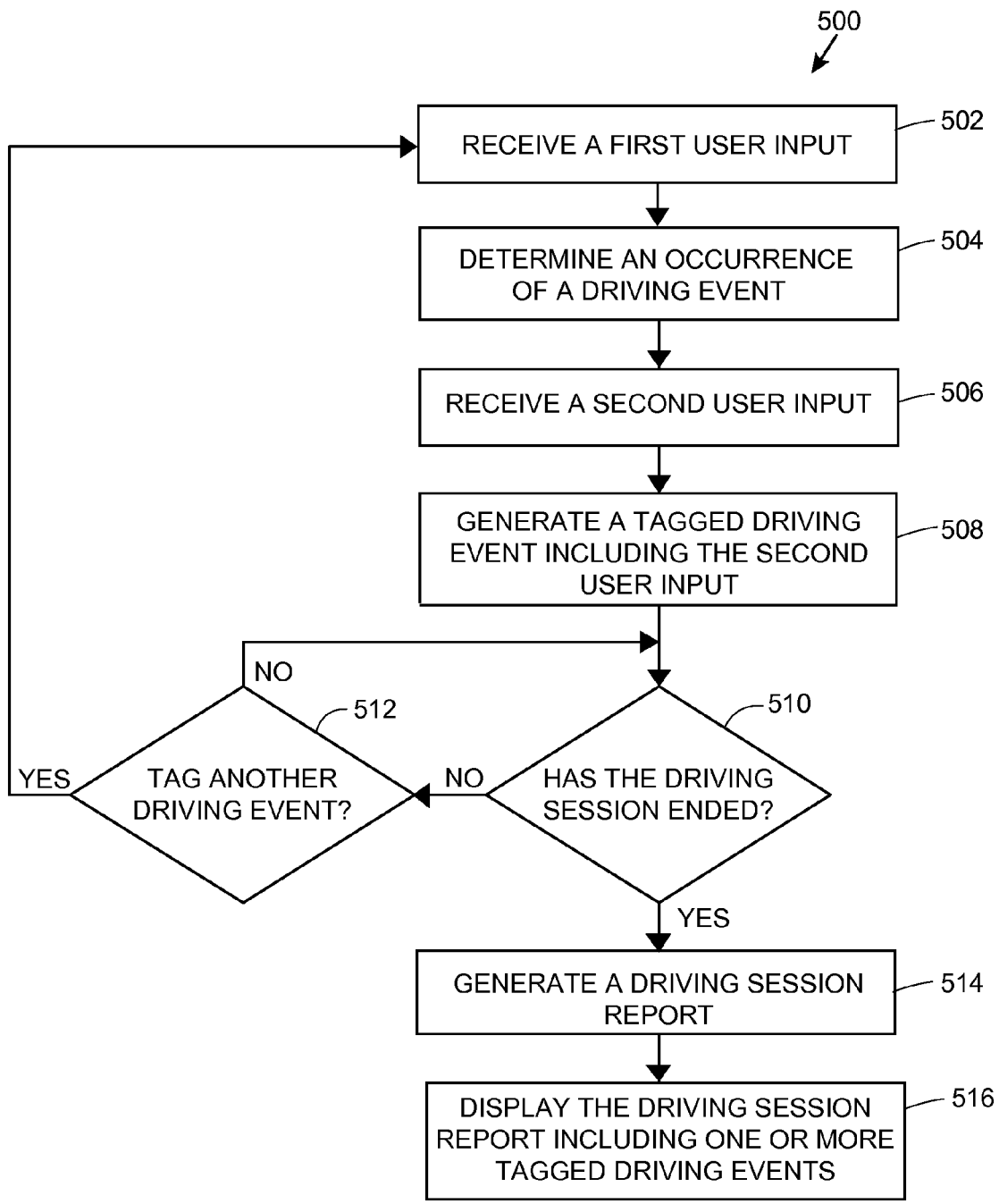
FIG. 5 illustrates an example method 500 in accordance with an exemplary aspect of the present disclosure.

FIG. 5 illustrates an example method 500 in accordance with an exemplary aspect of the present disclosure. In the present aspect, method 500 may be implemented by any suitable device, such as device 110, on-board computer, and/or server 140, as shown in FIG. 2, for example. In an aspect, method 500 may be performed by one or more processors, applications, and/or routines, such as any suitable portion of controller 204, applications 230, and/or routines 234, for example, as shown in FIG. 2.

Method 500 starts when one or more processors may receive a first user input (block 502). This first user input could include, for example, an input indicative of an occurrence of a driving event, such as the selection of portion 202 by a user, for example, as shown and described with reference to FIG. 2.

Method 500 includes determining an occurrence of a driving event (block 504). This could include, for example, microprocessor 210 determining that a tagged driving event is to be created upon receipt of the input received at block 502 once portion 202 is selected by a user.

Method 500 includes receiving a second user input (block 506). In various aspects, this second input could include text and/or audio describing the event and/or a severity level associated with the event, for example, as previously discussed with reference to FIG. 2. In various aspects, the second user input could additionally include a location and/or time associated with the driving event (block 506).

Method 500 includes generating a tagged driving event including the second user input (block 512). This could include, for example, microprocessor 210 storing the tagged driving event and its associated time, location, description, and/or severity level in a memory, such as data storage 228, for example.

Method 500 determines whether the driving session has ended (block 510). This determination could be made, for example, based on a comparison of an elapsed time and/or a position of the vehicle within a predetermined driving session route and/or receipt of an input indicating the end of the driving session from the user, such as selection of portion 306, for example, as shown in FIG. 3. If it is determined that the driving session has ended, then method 500 continues (block 514). Otherwise, method 500 continues (block 512).

Method 500 continues to run a corresponding application, such as driving-event tagging application 237, for example, to wait for additional occurrences of driving events to tag (block 512). If it is determined that a user has indicated additional driving events have occurred before the driving session has ended, then method 500 reverts back to receive a first user input (block 502) upon the occurrence of each driving event, where method 500 repeats (blocks 502, 504, and 506) for each driving event to generate a tagged driving event (block 508). Otherwise, method 500 continues to wait for additional driving events to be tagged (block 512) until the driving session ends (block 514).

Method 500 includes generating a driving session report using the tagged driving events generated during the driving session (block 514). This could include, for example, microprocessor 210 analyzing stored data corresponding to each of the generated tags and processing, parsing, and/or formatting the data so the driving session report is available for display in the appropriate format when selected.

Method 500 includes displaying the driving session report including one or more of the generated tagged driving events (block 516). This driving session report could include, for example, any suitable score, grade, rating, etc., as previously discussed with reference to FIGS. 4A-B. Additionally or alternatively, method 500 may include displaying a map of the driving session route including the tagged driving events and/or a listing of the tagged driving events as shown in FIG. 4A-B, respectively, for example (block 516).

The following additional considerations apply to the foregoing discussion. Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter of the present disclosure.

Additionally, certain aspects are described herein as including logic or a number of components or modules. Modules may constitute either software modules (e.g., code stored on a machine-readable medium) or hardware modules. A hardware module is tangible unit capable of performing certain operations and may be configured or arranged in a certain manner. In example aspects, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In some cases, a hardware module may include dedicated circuitry or logic that is permanently configured (e.g., as a special-purpose processor, such as a field programmable gate array (FPGA) or an application-specific integrated circuit (ASIC)) to perform certain operations. A hardware module may also include programmable logic or circuitry (e.g., as encompassed within a general-purpose processor or other programmable processor) that is temporarily configured by software to perform certain operations. It will be appreciated that the decision to implement a hardware module in dedicated and permanently configured circuitry or in temporarily configured circuitry (e.g., configured by software) may be driven by cost and time considerations.

Accordingly, the term hardware should be understood to encompass a tangible entity, be that an entity that is physically constructed, permanently configured (e.g., hardwired), or temporarily configured (e.g., programmed) to operate in a certain manner or to perform certain operations described herein. Considering aspects in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware and software modules can provide information to, and receive information from, other hardware and/or software modules. Accordingly, the described hardware modules may be regarded as being communicatively coupled. Where multiple of such hardware or software modules exist contemporaneously, communications may be achieved through signal transmission (e.g., over appropriate circuits and buses) that connect the hardware or software modules. In aspects in which multiple hardware modules or software are configured or instantiated at different times, communications between such hardware or software modules may be achieved, for example, through the storage and retrieval of information in memory structures to which the multiple hardware or software modules have access. For example, one hardware or software module may perform an operation and store the output of that operation in a memory device to which it is communicatively coupled. A further hardware or software module may then, at a later time, access the memory device to retrieve and process the stored output. Hardware and software modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example aspects, comprise processor-implemented modules.

Similarly, the methods or routines described herein may be at least partially processor-implemented. For example, at least some of the operations of a method may be performed by one or processors or processor-implemented hardware modules. The performance of certain of the operations may be distributed among the one or more processors, not only residing within a single machine, but deployed across a number of machines. In some example aspects, the processor or processors may be located in a single location (e.g., within a home environment, an office environment or as a server farm), while in other aspects the processors may be distributed across a number of locations.

The one or more processors may also operate to support performance of the relevant operations in a "cloud computing" environment or as a SaaS. For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example aspects, the one or more processors or processor-implemented modules may be located in a single geographic location (e.g., within a home environment, an office environment, or a server farm). In other example aspects, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" or a "routine" is a self-consistent sequence of operations or similar processing leading to a desired result. In this context, algorithms, routines and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one aspect" or "an aspect" means that a particular element, feature, structure, or characteristic described in connection with the aspect is included in at least one aspect. The appearances of the phrase "in one aspect" in various places in the specification are not necessarily all referring to the same aspect.

Some aspects may be described using the expression "coupled" and "connected" along with their derivatives. For example, some aspects may be described using the term "coupled" to indicate that two or more elements are in direct physical or electrical contact. The term "coupled," however, may also mean that two or more elements are not in direct contact with each other, but yet still co-operate or interact with each other. The aspects are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, condition A or B is satisfied by any one of the following: A is true (or present) and B is false (or not present), A is false (or not present) and B is true (or present), and both A and B are true (or present).

In addition, use of the "a" or "an" are employed to describe elements and components of the aspects herein. This is done merely for convenience and to give a general sense of the description. This description should be read to include one or at least one and the singular also includes the plural unless it is obvious that it is meant otherwise.

Upon reading this disclosure, those of skill in the art will appreciate still additional alternative structural and functional designs for providing an interface for inspecting indoor and outdoor map data through the disclosed principles herein. Thus, while particular aspects and applications have been illustrated and described, it is to be understood that the disclosed aspects are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A computer-implemented method for providing driver feedback related to a driving session in which driver skill data is collected, comprising:
    determining, by one or more processors, an occurrence of a driving event during the driving session upon receipt of a first user input;
    generating, by one or more processors, a tagged driving event including a description associated with the driving event upon receipt of a second user input;
    generating, by one or more processors, a driving session report based on the driving skill data collected during the driving session;
    displaying, by one or more processors, the driving session report including the tagged driving event; and
    displaying, by one or more processors, the description associated with the driving event upon receipt of a third user input indicating a selection of the tagged driving event from the driving session report.

2. The method of claim 1, wherein the act of generating the driving session report comprises:
    generating the driving session report upon completion of the driving session.

3. The method of claim 1, further comprising:
    recording a time and a geographic location of the driving event; and
    storing the tagged driving event including the time and the geographic location of the driving event.

4. The method of claim 3, wherein the act of displaying the driving session report comprises:
    displaying a map of a route associated with the driving session;
    displaying the tagged driving event on the map at the recorded geographic location; and
    displaying the description associated with the driving event upon receipt of the third user input indicating a selection of the tagged driving event from the map.

5. The method of claim 1, wherein the act of displaying the driving session report comprises:
    displaying a list of the collected driving skill data and the tagged driving event, and further comprising:
    displaying the description associated with the driving event upon receipt of the third user input indicating a selection of the tagged driving event from the list.

6. The method of claim 1, wherein the second user input comprises one or more of:
    voice input;
    text input; and
    an event description selected from a list of event descriptions.

7. The method of claim 1, further comprising:
generating a driver feedback score utilizing the driving skill data collected during the driving session and the tagged driving event; and
displaying the driver feedback score as part of the driving session report.

8. A non-transitory, tangible computer-readable medium storing machine readable instructions for providing driver feedback related to a driving session in which driver skill data is collected that, when executed by a processor, cause the processor to:
determine an occurrence of a driving event during the driving session upon receipt of a first user input;
generate a tagged driving event including a description associated with the driving event upon receipt of a second user input;
generate a driving session report based on the driving skill data collected during the driving session;
display the driving session report including the tagged driving event; and
display the description associated with the driving event upon receipt of a third user input indicating a selection of the tagged driving event from the driving session report.

9. The non-transitory, tangible computer-readable medium of claim 8, wherein the instructions to generate the driving session report include instructions that cause the processor to:
generate the driving session report upon completion of the driving session.

10. The non-transitory, tangible computer-readable medium of claim 8, further including instructions, that when executed by the processor, cause the processor to:
record a time and a geographic location of the driving event; and
store the tagged driving event including the time and the geographic location of the driving event.

11. The non-transitory, tangible computer-readable medium of claim 10, wherein the instructions to display the driving session report include instructions that cause the processor to:
display a map of a route associated with the driving session;
display the tagged driving event on the map at the recorded geographic location; and
display the description associated with the driving event upon receipt of the third user input indicating a selection of the tagged driving event from the map.

12. The non-transitory, tangible computer-readable medium of claim 8, wherein the instructions to display the driving session report include instructions that cause the processor to:
display a list of the collected driving skill data and the tagged driving event; and
display the description associated with the driving event upon receipt of the third user input indicating a selection of the tagged driving event from the list.

13. The non-transitory, tangible computer-readable medium of claim 8, wherein the second user input comprises one or more of:
voice input;
text input; and
an event description selected from a list of event descriptions.

14. The non-transitory, tangible computer-readable medium of claim 8, further including instructions, that when executed by the processor, cause the processor to:
generate a driver feedback score utilizing the driving skill data collected during the driving session and the tagged driving event; and
display the driver feedback score as part of the driving session report.

15. A device for providing driver feedback related to a driving session in which driver skill data is collected, comprising:
a processor configured to:
determine an occurrence of a driving event during the driving session upon receipt of a first user input;
generate a tagged driving event including a description associated with the driving event upon receipt of a second user input;
generate a driving session report based on the driving skill data collected during the driving session; and
a graphical processing unit (GPU) configured to:
display the driving session report including the tagged driving event; and
display the description associated with the driving event upon receipt of a third user input indicating a selection of the tagged driving event from the driving session report.

16. The device of claim 15, wherein the processor is further configured to generate the driving session report upon completion of the driving session.

17. The device of claim 15, wherein the processor is further configured to record a time and a geographic location of the driving event, and to store the tagged driving event including the time and the geographic location of the driving event.

18. The device of claim 17, wherein the GPU is further configured to:
display a map of a route associated with the driving session;
display the tagged driving event on the map at the recorded geographic location; and
display the description associated with the driving event upon receipt of the third user input indicating a selection of the tagged driving event from the map.

19. The device of claim 15, wherein the GPU is further configured to display a list of the collected driving skill data and the tagged driving event, and to display the description associated with the driving event upon receipt of the third user input indicating a selection of the tagged driving event from the list.

20. The device of claim 15, wherein the second user input comprises one or more of:
voice input;
text input; and
an event description selected from a list of event descriptions.

21. The device of claim 15, wherein the processor is further configured to generate a driver feedback score utilizing the driving skill data collected during the driving session and the tagged driving event, and
wherein the GPU is further configured to display the driver feedback score as part of the driving session report.

* * * * *